United States Patent

Fischer et al.

(10) Patent No.: US 10,122,230 B2
(45) Date of Patent: Nov. 6, 2018

(54) PERMANENT-FIELD ARMATURE WITH GUIDED MAGNETIC FIELD

(71) Applicant: Siemens Aktiengesellschaft, München (DE)

(72) Inventors: Ralf Fischer, Nürnberg (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 397 days.

(21) Appl. No.: 14/858,800

(22) Filed: Sep. 18, 2015

(65) Prior Publication Data

US 2016/0087494 A1   Mar. 24, 2016

(30) Foreign Application Priority Data

Sep. 19, 2014   (EP) .................... 14185613

(51) Int. Cl.
*H02K 1/27* (2006.01)
*H02K 1/02* (2006.01)
*H02K 1/24* (2006.01)

(52) U.S. Cl.
CPC ............ *H02K 1/2766* (2013.01); *H02K 1/02* (2013.01); *H02K 1/246* (2013.01); *H02K 2213/03* (2013.01)

(58) Field of Classification Search
CPC ......... H02K 1/02; H02K 1/276; H02K 1/2766
See application file for complete search history.

(56) References Cited

U.S. PATENT DOCUMENTS

| 5,684,352 A | 11/1997 | Mita et al. |
| 5,693,250 A | 12/1997 | El-Antably et al. |
| 6,483,221 B1 | 11/2002 | Pawellek et al. |
| 6,628,031 B2 | 9/2003 | Vollmer |

(Continued)

FOREIGN PATENT DOCUMENTS

| DE | 18 14 383 A1 | 12/1968 |
| EP | 2 775 591 A1 | 9/2014 |

(Continued)

OTHER PUBLICATIONS

Rolf Vollmer, U.S. Pat. No. 7,977,826, Jul. 12, 2010, 2009/0295251.

(Continued)

*Primary Examiner* — Dang Le (74) *Attorney, Agent, or Firm* — Henry M. Feiereisen LLC (57) ABSTRACT

A permanent-field armature for an electrical machine includes an armature body having internal magnet pockets, and a plurality of permanent magnets having a magnetization for generating a magnetic field and disposed in the magnetic pockets in one-to-one correspondence. The armature body guides the magnetic field between the magnet pockets and magnetic poles of the armature on an armature surface. Each magnet pocket is formed for guiding the magnetic field in a material which has at least one area having a magnetic anisotropy with an easy axis and a hard axis of magnetizing capability, with the easy axis being aligned in parallel relation to or at least at an angle of less than 25° to a magnetization direction of the magnetization of the permanent magnet disposed in the magnet pocket.

16 Claims, 4 Drawing Sheets

(56) References Cited

U.S. PATENT DOCUMENTS

| | | | |
|---|---|---|---|
| 6,661,147 B2 * | 12/2003 | Tajima | H02K 1/246 310/156.08 |
| 6,768,238 B2 | 7/2004 | Knauff et al. | |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,285,883 B2 | 10/2007 | Bott et al. | |
| 7,564,158 B2 | 7/2009 | Huth et al. | |
| 7,709,984 B2 | 5/2010 | Braun et al. | |
| 7,732,967 B2 | 6/2010 | Vollmer | |
| 7,755,315 B2 | 7/2010 | Bott et al. | |
| 7,777,373 B2 | 8/2010 | Bott et al. | |
| 7,859,160 B2 | 12/2010 | Vollmer | |
| 7,915,777 B2 | 3/2011 | Vollmer | |
| 8,026,640 B2 | 9/2011 | Bott et al. | |
| 8,063,517 B2 | 11/2011 | Bott et al. | |
| 8,115,360 B2 | 2/2012 | Vollmer | |
| 8,134,273 B2 | 3/2012 | Vollmer | |
| 8,227,951 B2 | 7/2012 | Grossmann et al. | |
| 8,283,815 B2 | 10/2012 | Vollmer | |
| 8,378,541 B2 | 2/2013 | Vollmer | |
| 8,441,158 B2 | 5/2013 | Vollmer | |
| 8,664,820 B2 * | 3/2014 | Cho | F04B 35/04 310/156.45 |
| 8,674,560 B2 | 3/2014 | Budde et al. | |
| 8,853,894 B2 | 10/2014 | Fick et al. | |
| 8,922,072 B2 | 12/2014 | Bott et al. | |
| 2005/0035677 A1 | 2/2005 | Evans et al. | |
| 2006/0219880 A1 | 10/2006 | Braun et al. | |
| 2007/0040466 A1 | 2/2007 | Vollmer | |
| 2007/0114861 A1 | 5/2007 | Bott et al. | |
| 2007/0257566 A1 | 11/2007 | Vollmer | |
| 2007/0257575 A1 | 11/2007 | Vollmer | |
| 2008/0169718 A1 | 7/2008 | Schunk et al. | |
| 2008/0185931 A1 | 8/2008 | Platen et al. | |
| 2008/0289440 A1 | 11/2008 | Vollmer | |
| 2008/0315704 A1 | 12/2008 | Vollmer | |
| 2009/0009114 A1 | 1/2009 | Schunk | |
| 2009/0015080 A1 | 1/2009 | Vollmer | |
| 2009/0152959 A1 | 6/2009 | Vollmer | |
| 2009/0160283 A1 | 6/2009 | Vollmer | |
| 2009/0184602 A1 | 7/2009 | Braun et al. | |
| 2009/0251013 A1 | 10/2009 | Vollmer | |
| 2009/0315424 A1 | 12/2009 | Vollmer | |
| 2010/0000830 A1 | 1/2010 | Budde et al. | |
| 2010/0013333 A1 | 1/2010 | Vollmer | |
| 2010/0133940 A1 | 6/2010 | Grossmann et al. | |
| 2010/0264770 A1 | 10/2010 | Braun et al. | |
| 2012/0025654 A1 | 2/2012 | Bach et al. | |
| 2013/0127264 A1 | 5/2013 | Fick et al. | |
| 2013/0127280 A1 * | 5/2013 | Sugimoto | H02K 1/2766 310/156.01 |
| 2013/0147285 A1 | 6/2013 | Vollmer | |
| 2013/0241324 A1 | 9/2013 | Mader et al. | |
| 2013/0241335 A1 | 9/2013 | Vollmer | |
| 2013/0241338 A1 | 9/2013 | Mader et al. | |
| 2013/0249340 A1 | 9/2013 | Potoradi et al. | |
| 2014/0028135 A1 | 1/2014 | Vollmer | |
| 2014/0042857 A1 | 2/2014 | Vollmer | |

FOREIGN PATENT DOCUMENTS

| | | |
|---|---|---|
| GB | 1 114 562 A | 4/1965 |
| GB | 2 506 683 A | 4/2014 |
| JP | H11 55 911 A | 2/1999 |
| JP | 4343281 B2 | 10/2009 |

OTHER PUBLICATIONS

Budde et al., U.S. Pat. No. 8,022,580, 2009/0302832, Dec. 10, 2009.

* cited by examiner

PERMANENT-FIELD ARMATURE WITH GUIDED MAGNETIC FIELD

CROSS-REFERENCES TO RELATED APPLICATIONS

This application claims the priority of European Patent Application, Serial No. 14185613.8, filed Sep. 19, 2014, pursuant to 35 U.S.C. 119(a)-(d), the disclosure of which is incorporated herein by reference in its entirety as if fully set forth herein.

BACKGROUND OF THE INVENTION

The present invention relates to a permanent-magnetic field armature, in short permanent-field armature for an electrical machine and also to an electrical machine with such an armature and to a method for manufacturing the armature.

The following discussion of related art is provided to assist the reader in understanding the advantages of the invention, and is not to be construed as an admission that this related art is prior art to this invention.

Permanent magnet-field electrical machines have a rotor structure in which the magnets are disposed inside the rotor, which is also referred to as IPM construction (IPM—Interior Permanent Magnet). To this end slots or magnet pockets are provided in the rotor laminated core in which the permanent magnets are disposed. Rotors or this type are especially robust mechanically because the internal permanent magnets are protected from mechanical influences.

In an armature with interior magnet pockets, i.e. a rotor for example, the problem arises that, to guide the magnetic flux between the armature surface and the interior magnet pockets a soft-magnetic material should be used in the armature body. However a magnetic short circuit within the armature body can also be produced by such a soft magnetic material, so that the magnetic excitation of the permanent magnets cannot be used for driving the armature. This magnetic short circuit is also referred to as leakage.

To address this problem, the provision of so-called flux inhibitors in the rotor body has been proposed. These flux inhibitors can be embodied between the interior magnet pockets and be hollow spaces filled with air for example. The disadvantage here is that such hollow spaces destabilize the rotor body mechanically.

It would be desirable and advantageous to provide an improved permanently excited armature of an electrical machine to obviate prior art shortcomings and to reduce a magnetic short circuit of the magnetic field of the permanent magnets within the armature body.

SUMMARY OF THE INVENTION

According to one aspect of the present invention, a permanent-field armature for an electrical machine includes an armature body having internal magnet pockets, and a plurality of permanent magnets having a magnetization for generating a magnetic field and disposed in the magnetic pockets in one-to-one correspondence, the armature body being configured to guide the magnetic field between the magnet pockets and magnetic poles of the armature on an armature surface, each magnet pocket being formed for guiding the magnetic field in a material which has at least one area having a magnetic anisotropy with an easy axis and a hard axis of magnetizing capability, with the easy axis being aligned in parallel relation to or at least at an angle of less than 25° to a magnetization direction of the magnetization of the permanent magnet disposed in the magnet pocket.

In accordance with the present invention, a permanent-field armature for an electrical machine is involved as armature. The electrical machine can for example be a linear machine or a rotation machine. In the latter case the armature is embodied as a rotor. The armature according to the invention has a number of permanent magnets with a magnetization for creating a permanent magnetic field. The permanent magnets are disposed in an armature body. For this purpose the armature body has interior magnet pockets in which one of the permanent magnets is disposed in each case. The term "magnet pockets" is a term known in the art and relates to slots or wells inside the armature body. The armature body is designed to guide the magnetic field between the magnet pockets in the magnetic poles of the armature on its armature surface. In accordance with the prior art, the armature body can be embodied for this purpose from a soft-magnetic material and have the described flux inhibitors between the magnet pockets.

In contrast thereto, in accordance with the present invention, for guiding the magnetic field each magnet pocket is embodied in a material which, at least in some areas or completely, has a magnetic anisotropy with an easy axis and a hard axis of magnetizability. The easy axis is also referred to as the preferred direction. The material can also have more than one easy axis with the largest value of relative permeability and/or more than one hard axis with the smallest value of relative permeability. The provision of a single easy axis is advantageous in order to avoid the flux guidance jumping around. The easy axis of the material is aligned in parallel to a magnetization direction of the magnetization of the permanent magnet disposed in the magnet pocket. The parallel alignment does not have to be perfect in such cases. The easy axis can be aligned at least at an angle of less than 25°, preferably less than 15° to the magnetization direction of the magnetization of the permanent magnet. The described alignment of the easy axis can be especially realized in an edge area adjoining the magnet pocket. The anisotropy of the material is especially effected by a magnetocrystalline anisotropy.

The advantage produced by the invention is that the leakage of the magnetic field of the permanent magnets within the armature body is low, so that a higher usable flux is made possible, i.e. a magnetic flux which exits from the armature (north pole) and enters (south pole) through the magnetic poles. A leakage means a deviation of the magnetic flux from the magnetization direction of the permanent magnets within the armature body. It is reduced by the alignment of the easy axis.

In the event of the armature being embodied as a rotor for a rotation machine, it is advantageous when, for each magnet pocket in an edge area adjoining the magnet pocket, the easy axis is aligned in the radial direction. This enables pole gaps to be provided between the magnetic poles which have an especially low magnetic interactivity, so that a small magnetic voltage drop is provided at the q inductance (i.e. along the q axis), which in its turn makes a high maximum power possible.

According to another advantageous feature of the present invention, the armature body can be formed from a number of segments such that the easy axis at each of the segments is aligned separately from the other ones of the segments. Thus, in each segment, the alignment of the axes of the anisotropy is embodied separately from the other segments. In other words, for each segment, the alignment of the axes of the anisotropy has been set before the assembly of the armature body. This is advantageous because an inhomogeneous anisotropy field can be set in the armature. With a rotor in particular the alignment of the easy axis in a radially-interior area can be different to the alignment of the easy axis in a radially-exterior area, i.e. on the armature surface.

According to another advantageous feature of the present invention, at a contact surface between two of the segments, the easy axis of one of the two segments and the easy axis of the other one of the two segments can be disposed in parallel or at least at an angle of less than 25° to one another. The easy axes are thus preferably aligned tangentially or laterally. This enables the magnetic circuit inside the armature to be closed with an especially low loss.

According to another advantageous feature of the present invention, the material can be arranged contiguously between neighboring magnet pockets. In other words, in the case the rotor, no flux inhibitor in the form of a hollow space is formed along the circumferential direction between the magnet pockets, but the anisotropic material is provided contiguously, of which the easy axis can be aligned radially for example. By eliminating the need for flux inhibitors in the form of hollow spaces, the armature becomes mechanically especially stable.

A further advantage in dispensing with flux inhibitors is the especially dense arrangement of permanent magnets disposed with opposing poles. Accordingly the invention provides for designs of the armature in which a number of the magnetic poles can amount to four or six or eight or more than eight. The larger the number of magnetic poles is, the larger the drive force, especially the torque, can be.

It has proved especially suitable for a relative magnetic permeability of the material along the easy axis to have a value greater than 15, especially greater than 20 and along the hard axis to have a value less than two, especially less than 1.6. The field-guidance characteristic of the armature body can be combined especially well with the suppression of the leakage field, i.e. the magnetic short-circuit. In order to obtain the described magnetic characteristics, the alloying, the tempering process in the embodiment of the armature body and/or of its segments as well as the magnetic field with which the anisotropy is set are available as parameters during the manufacture of the armature. Simple tests make the parameterization of the manufacturing process possible here, in order to obtain the described values for the relative magnetic permeability.

According to another advantageous feature of the present invention, the material can have a magnetic saturation which lies at a flux density of more than 0.8 Tesla, preferably at at least 1.0 Tesla. The advantage produced by this is that the stator field can be used especially efficiently for driving the armature.

In order to realize all the described magnetic properties, according to another advantageous feature of the present invention, the material can be neodymium-iron-boron, NdFeB. This material is obtainable in alloys in which the relative magnetic permeability can be set to the described values and through a coercitive field strength of less than 10 kiloamperes per meter the described field-guiding properties can be embodied in the armature body. The material is thus not a permanent magnet, but has flux-guiding properties.

According to another aspect of the present invention, an electrical machine includes a stator having magnetic coils, and an armature comprising an armature body having internal magnet pockets, and a plurality of permanent magnets having a magnetization for generating a magnetic field and disposed in the magnetic pockets in one-to-one correspondence, said armature body being configured to guide the magnetic field between the magnet pockets and magnetic poles of the armature on an armature surface, each said magnet pocket being formed for guiding the magnetic field in a material which has at least one area having a magnetic anisotropy with an easy axis and a difficult axis of magnetizing capability, said easy axis being aligned in parallel relation to or at least at an angle of less than 25° to a magnetization direction of the magnetization of the permanent magnet disposed in the magnet pocket.

In accordance with the present invention, an electrical machine has a stator with magnetic coils for creating a magnetic stator field. Through the magnetic interaction of the stator field with the magnetic poles on the armature surface a dynamoelectric effect is produced in a manner known per se. The electrical machine can also be embodied as a generator in which a voltage is induced in the magnetic coils. The electrical machine according to the invention has the advantage that it can be operated especially efficiently, since the stray flux in the armature is low. In addition a high regulation dynamic is made possible, since the delay time during current buildup, because of the low inductivity along the q axis, i.e. in the area of the pole gaps, is low.

According to still another aspect of the present invention, a method for manufacturing an armature includes providing an armature body with interior magnet pockets, disposing a permanent magnet in each of the magnet pockets, and, to guide the magnetic field of the permanent magnets through the armature body on its armature surface, providing a magnetic anisotropy in a material of the armature body such that an easy axis of the anisotropy is aligned, for each magnetic pocket, in an edge area adjoining each magnetic pocket in parallel relation to or at least at an angle of less than 25° to a magnetization direction of a magnetization of the permanent magnet disposed in the magnet pocket.

According to another advantageous feature of the present invention, the armature body, for aligning the easy axis, can be formed from segments, and each segment can be formed from a blank which has a predetermined magnetic anisotropy. In other words, the armature body is thus composed of components or segments of which each has its own suitable alignment of the easy axis corresponding to the position of the segment in the armature body. The advantage produced by this is that in each segment individually a suitable alignment of the easy axis can be imprinted or implanted without the other segments being influenced by this.

According to another advantageous feature of the present invention, implanting of the alignment can be set from outside for the individual segments or also for the complete armature body, for example by means of a magnetic field which penetrates the material during the manufacturing of the armature body or of a segment thereof. The advantage produced by this is that the anisotropy field, i.e. the course of the easy axis can be predetermined through a correspondingly selected field course of the magnetic field implanted from outside.

According to another advantageous feature of the present invention, the armature body or individual segments of the armature body can be formed by pressing a powder and/or a granulate which contains the material in each case, wherein at the same time this powder and/or granulate has a magnetic field applied to it. By using a powder and/or granulate the shape of the armature body and/or of a segment thereof can expediently be set through a corresponding press shape for the function of the armature and at the same time the easy axis can be aligned by means of the magnetic field during pressing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments explained below involve preferred embodiments of the invention. In the exemplary embodiments however the described components of the embodiments each represent individual features of the invention to be considered independently of one another, which also develop the invention independently in each case and thus are also to be seen, individually or in a combination other than that shown, as a component of the invention. Furthermore the described embodiments are also able to be supplemented by further of the already described features of the invention.

Figure 1:
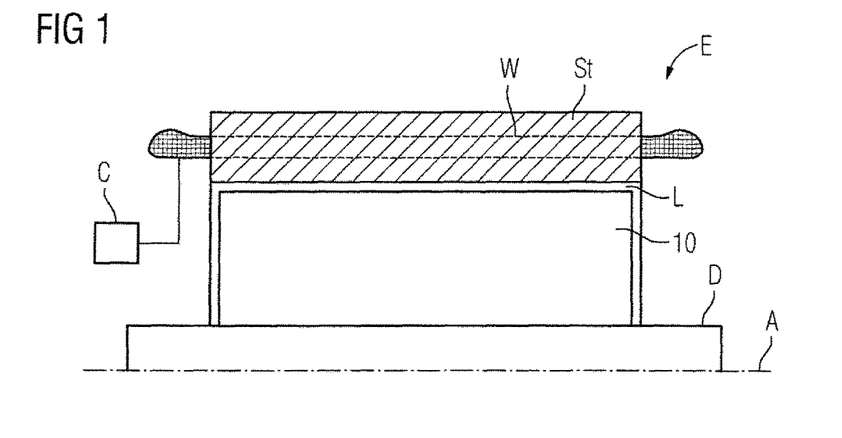
FIG. 1 shows a schematic longitudinal section of an electric machine according to the present invention.

Turning now to the drawing, and in particular to FIG. 1, there is shown a schematic longitudinal section of one embodiment of an electric machine according to the present invention, generally designated by reference character E. The electrical machine E can involve a synchronous motor for example. In FIG. 1, the axis of rotation A also represents the axis of symmetry of the diagram. The electrical machine E includes a stator St, in which windings W of electrical coils are disposed, wherein only one of the windings W is shown in FIG. 1. The windings W can be powered alternately by an alternating current source C, through which inside the stator St a magnetic rotating field arises in an air gap L of the electrical machine E. The alternating current source C can for example be an inverter or a fixed-frequency electrical supply network. The electrical machine E can also be embodied as a generator, wherein the alternating current source C can be dispensed with or can be replaced by a rectifier.

A rotor 10, which can be connected in a torsion-proof manner to a shaft D, can be located inside the stator St. The shaft D is supported rotatably in the stator St, able to be rotated around the axis of rotation A. The rotor 10 can be one embodiment of an armature according to the invention.

Figure 2:
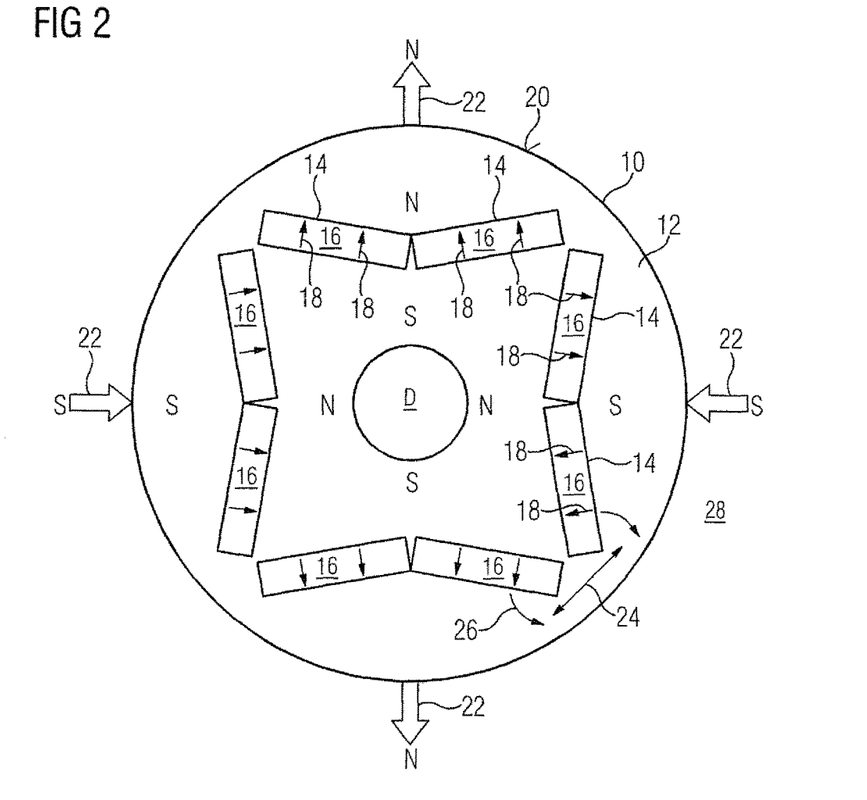
FIG. 2 shows a schematic cross-section of one embodiment of a rotor for the electrical machine of FIG. 1.

FIG. 2 shows the rotor 10 only in cross-section. Of the rotor 10, FIG. 2 shows an armature body 12 in which magnet pockets 14 are formed. For sake of clarity, only a few of the magnet pockets 14 are provided with a reference character. The magnet pockets 14 can for example be embodied as wells, of which the longitudinal axis is aligned in parallel to the axis of rotation A, i.e. in parallel to the longitudinal extent of the shaft D. A permanent magnet 16 can be disposed in each of the magnet pockets 14. For sake of clarity, again only a few permanent magnets 16 are provided with a reference character. The permanent magnets 16 can have a magnetization with the magnetization direction 18 which is illustrated by a direction arrow in FIG. 2 and also in the further figures. Again only a few magnetization directions 18 are provided with a reference character. Through the magnetization directions 18 north poles N and south poles S are produced in each case on the permanent magnets 16. Through the magnetic field emerging from the permanent magnets which penetrates the armature body 12, magnetic poles 22 are produced on an armature surface 20 which once again in accordance with the permanent magnets 16 disposed under the armature surface 20, are north poles N or south poles S. FIG. 2 illustrates how through a leakage flux 24 within the armature body 12, a magnetic flux 26 emerging from a permanent magnet 16 can enter into a neighboring permanent magnet 16 as a leakage flux 24 or can reach the magnet without getting into a vicinity 28 of the armature 10, i.e. into the air gap L.

With the rotor 10 however the leakage flux 24 is especially small, so that the efficiency of the electrical machine E is not significantly adversely affected. Also no flux inhibitors are needed in the rotor 10 for this, which can adversely affect the mechanical stability of the rotor 10 through hollow spaces.

The following description explains with reference to FIGS. 3 to 7 as to how the stray flux 24 can be reduced.

Figure 3:
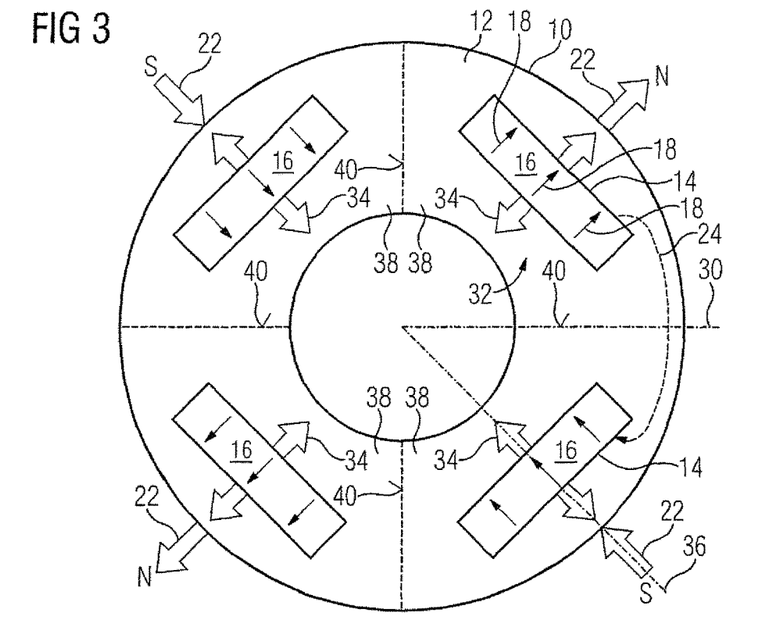
FIG. 3 shows a schematic cross-section of another embodiment of a rotor for the electrical machine of FIG. 1.

FIG. 3 shows a further embodiment of the armature according to the invention in the form of rotor 10 which can have the same functionality as the armature 10 of FIG. 2. Parts corresponding with those in FIG. 2 are denoted by identical reference numerals and not explained again. The description below will center on the differences between the embodiments. In this embodiment, the rotor 10 in FIG. 3 has only one permanent magnet 16 per magnet pole 22 in cross section, wherein the rotor 10 of FIG. 2 has two permanent magnets 16 per magnet pole 22. The following description relating to FIG. 3 also equally applicable to the rotor 10 depicted in FIG. 2 however.

To reduce or suppress in the rotor 10 a crossover of the magnetic flux of a permanent magnet 16 transverse to a q axis 30 within the armature body 12, the armature body 18 has a material 32 with a magnetic anisotropy. Advantageously, the magnetic anisotropy is embodied such that a single easy axis 34 and a single hard axis aligned at a right angle to the easy axis 34 is formed.

In FIG. 3 a direction in which the easy axis 34 extends or runs is illustrated by a respective double-ended arrow. The easy axis 34 is aligned in each case in the area of the magnet pockets 14 preferably in parallel to the magnetization direction 18, as is illustrated in FIG. 3. The parallel alignment of the magnetization 18 is provided especially in the area of the magnet pockets 14 along a d axis 36.

In order to make possible for the rotor 10 the different alignments of the easy axis 34 being produced along the circumference of the rotor, the rotor 10 can be formed from segments 38. The rotor 10 can then be formed from anisotropic soft-magnetic material 32 which is divided into the segments 38 with the number 2p, wherein p is the number of pole pairs. With the four poles shown in FIG. 3 four segments 38 are thus produced. The segments 38 are divided alternately into north pole N and south pole S. In each magnetic segment 38 the slots of the magnet pockets 14 for the permanent magnets 16 are present. The armature body 12 can be created from the segments 38 through material-to-material connection of the segments 38. In this case the alignment of the easy axis 34 can be set during manufacture of the entire armature body 12 or also during manufacture of the individual segments 38. The material-to-material bond can be achieved for example by gluing, sintering and/or soldering.

The material 32 is advantageously characterized by the following values for the relative permeability: Along the easy axis 34, it has a value of advantageously greater than 15, especially greater than 20. Along the hard axis aligned at a right angle thereto (not shown), the relative permeability advantageously has a value of less than two, especially less than 1.6. The saturation flux density preferably amounts to more than 0.8 Tesla, especially to more than one Tesla.

On surfaces 40 at which the segments 38 touch each other, an alignment of the easy axis 34 of the anisotropic material 32 can be set differently. In this connection, reference is made to FIGS. 4 to 6 hereinafter.

Figure 4:
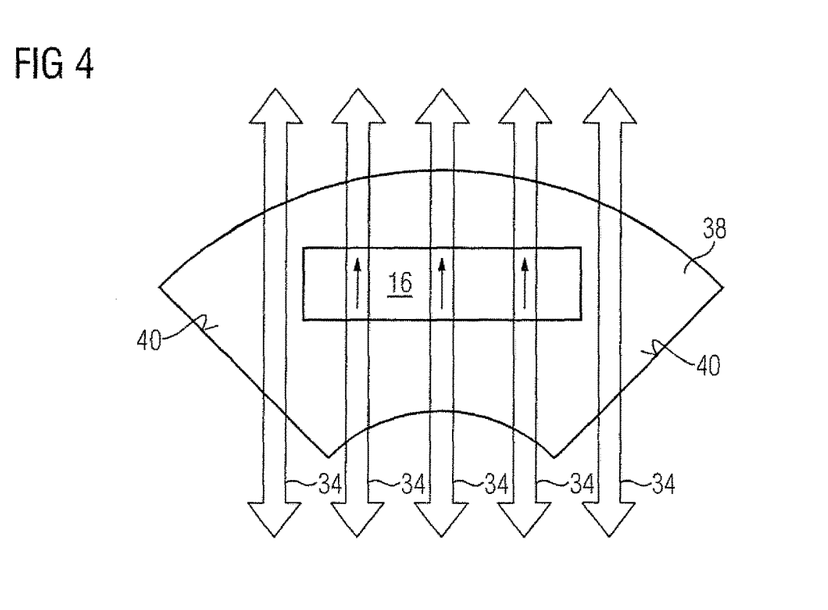
FIG. 4 shows a schematic diagram of a segment of the rotor of FIG. 3 with a parallel alignment of the easy axis of a magnetic anisotropy.
Figure 5:
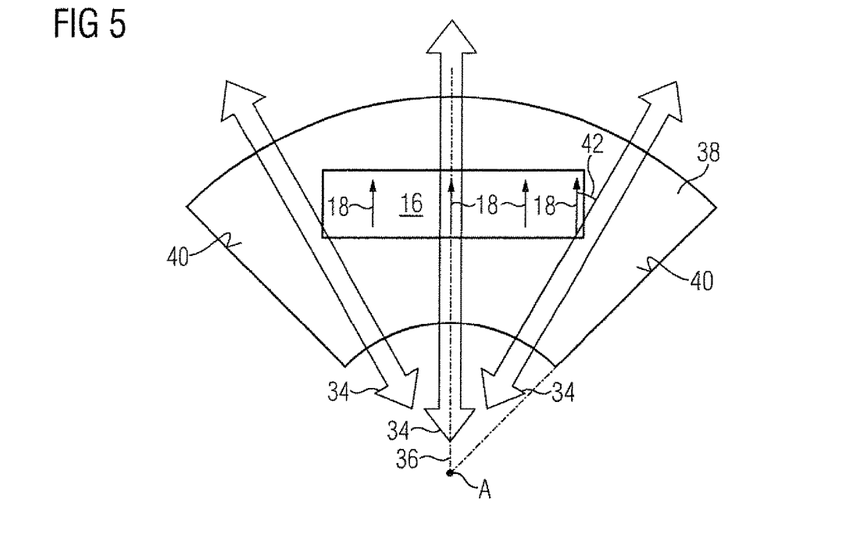
FIG. 5 shows a schematic diagram of a segment of the rotor with a radial alignment of an easy axis of the anisotropy.
Figure 6:
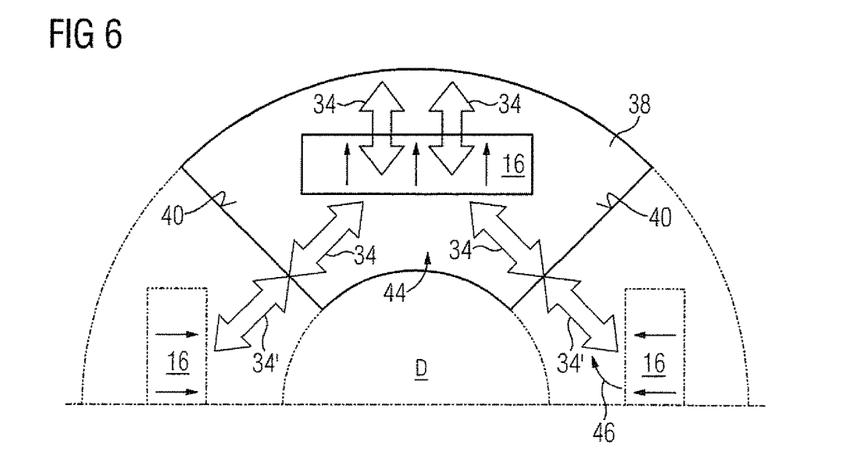
FIG. 6 shows a schematic diagram of a segment of the rotor with a lateral alignment of an easy axis of a magnetic anisotropy.

FIGS. 4 to 6 show each a single segment 38. In FIG. 4, the alignment of the easy axis 34 over the entire segment 38 is parallel. This makes the manufacturing of an individual segment especially simple and thus low-cost.

In FIG. 5 the alignment of the easy axis 34 for the segment 38 is radial in relation to the axis of rotation A. The parallel alignment of the easy axis 34 to the magnetization 18 is produced here along the d axis 36. In the edge area of the permanent magnet 16 the magnetization 18 and the easy axis 34 establish an angle 42, which is advantageously less than 25 degrees. In FIG. 6, in a radially interior area 44 in relation to the permanent magnet 16, the easy axis 34 is aligned in parallel to an easy axis 34' of the respective neighboring segment. At the boundary surfaces 40 the abutting easy axes 34, 34' are aligned in parallel to one another. Through this, the magnetic circuit 46 in the radially interior area 44 can be especially easily closed, so that a leakage flux in the area of the shaft D is reduced. The easy axes 34, 34' are thus aligned laterally in the radially interior area 44.

Figure 7:
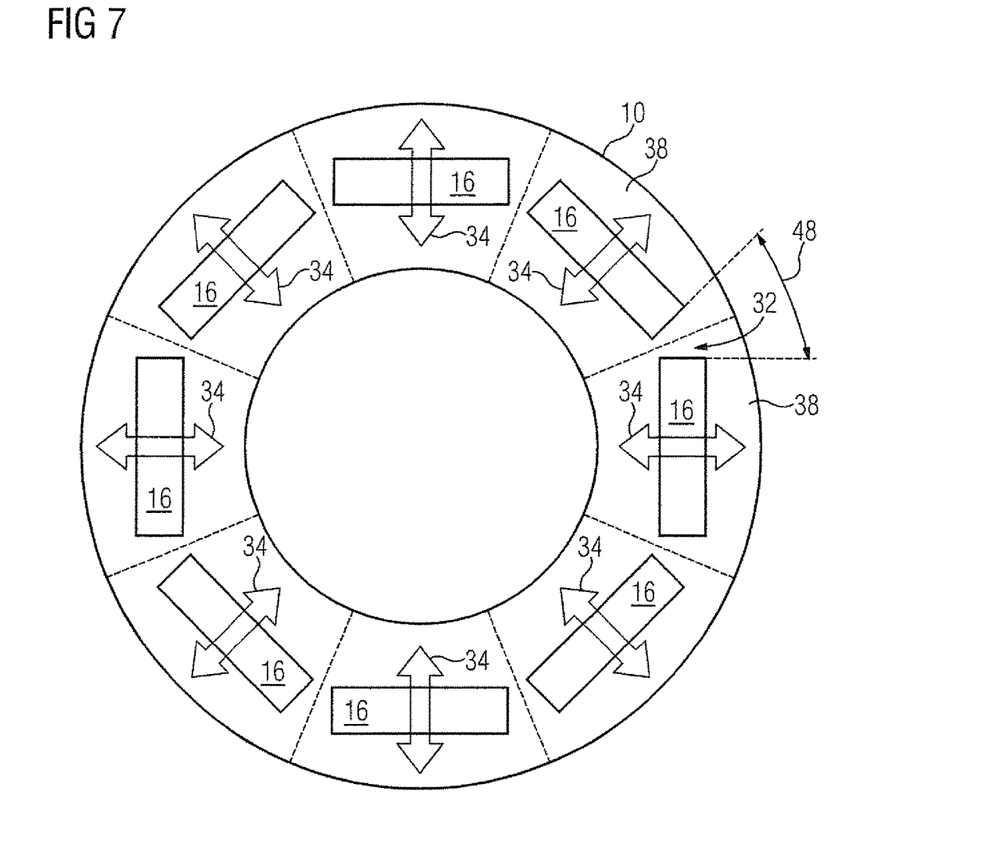
FIG. 7 shows a schematic cross-section of still another embodiment of a rotor with eight magnetic poles for the electrical machine of FIG. 1.

FIG. 7 shows a rotor 10 with eight magnetic poles, i.e. with a pole pair number p equal to four, in cross-section. The permanent magnets 16 are disposed comparatively close to one another in this arrangement. In other words, a respective pole gap 48 between neighboring segments 38 can be embodied smaller than with a conventional permanent magnet field rotor. The reason for this is that in the area of the pole gaps 48 no flux inhibitor in the form of a hollow space has to be provided between the between the permanent magnet 16. The anisotropic material 32 can be disposed there, so that the rotor 10, even with a pole number of eight, remains mechanically stable.

In the shown exemplary embodiment, the advantages of an IPM structure are combined with the advantages of a massive armature body 12, i.e. an armature body without hollow spaces as flux inhibitors. In addition, a small inductance is produced along the q axes 30, i.e. in the pole gaps 48. Thus a lower voltage drop is produced at the q inductance, which in turn makes possible a high maximum power. In addition the delay time during current buildup in the stator St is low, which makes possible a high regulation dynamic of the electrical machine E.

To manufacture the armature body 12 or an individual segment 38, a powder or granulate can be employed for example which has an alloy with neodymium-iron-boron (NdFeB), wherein with this alloy, in a manner known per se, a coercitive field strength in a range between ten and one thousand, especially between 50 and 500 Amperes per centimeter is set. A remanence is set in the range of between zero and two is advantageous, especially in a range between zero and 1.5 Tesla.

The powder can be pressed into the shape of the armature body 12 or into the shape of an individual segment 38. Here the power can have a magnetic field applied to it which for example can be created by a magnetic coil. Through the magnetic field the alignment of the easy axis 34 is defined during pressing of the powder and/or granulate. Thereafter the pressed powder and/or granulate can be strengthened for example by sintering.

Overall it is shown by the examples how, through the invention, a permanent magnet machine with internal magnets and with low armature feedback can be provided by anisotropic soft-magnetic material.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A permanent-field armature for an electrical machine, said permanent-field armature comprising:
    an armature body having internal magnet pockets forming a magnetic circuit in a radially interior area of the armature body; and
    a plurality of permanent magnets having a magnetization for generating a magnetic field and disposed in the magnetic pockets in one-to-one correspondence, said armature body being configured to guide the magnetic field between the magnet pockets and magnetic poles of the armature on an armature surface, each said magnet pocket being formed for guiding the magnetic field in a material which has at least one area having a magnetic anisotropy with an easy axis and a hard axis of magnetizing capability, said easy axis being aligned in parallel relation to or at least at an angle of less than 25° to a magnetization direction of the magnetization of the permanent magnet disposed in the magnet pocket, wherein the armature body is formed from a number of segments such that the easy axis at each of the segments is aligned separately from the other ones of the segments, wherein at a contact surface between two of the segments, the easy axis of one of the two segments and the easy axis of the other one of the two segments are disposed in parallel relation or at least at an angle of less than 25° to one another, thereby being tangentially or laterally disposed, wherein the magnetic circuit is closed in the radially interior area of the armature body, so that a leakage flux in a radially inner area of the radially interior area is reduced.

2. The armature of claim 1, constructed in the form of a rotor for a rotation machine.

3. The armature of claim 1, wherein the easy axis is aligned in a radial direction, at least in an edge area adjoining the magnet pocket.

4. The armature of claim 1, wherein the material is arranged contiguously between neighboring ones of the magnet pockets.

5. The armature of claim 1, wherein a number of magnetic poles amounts to 4 or 6 or 8 or more than 8.

6. The armature of claim 1, wherein the material has a relative magnetic permeability which along the easy axis has a value of greater than 15, preferably greater than 20, and along the hard axis has a value of less than 2, preferably less than 1.6.

7. The armature of claim 1, wherein the material has a magnetic saturation which lies at a flux density of more than 0.8 Tesla, preferably at at least 1.0 Tesla.

8. The armature of claim 1, wherein the material is neodymium-iron-boron, NdFeB.

9. An electrical machine, comprising:
a stator having magnetic coils; and
an armature comprising an armature body having internal magnet pockets forming a magnetic circuit in a radially interior area of the armature body, and a plurality of permanent magnets having a magnetization for generating a magnetic field and disposed in the magnet pockets in one-to-one correspondence, said armature body being configured to guide the magnetic field between the magnet pockets and magnetic poles of the armature on an armature surface, each said magnet pocket being formed for guiding the magnetic field in a material which has at least one area having a magnetic anisotropy with an easy axis and a hard axis of magnetizing capability, said easy axis being aligned in parallel relation to or at least at an angle of less than 25° to a magnetization direction of the magnetization of the permanent magnet disposed in the magnet pocket, wherein the armature body is formed from a number of segments such that the easy axis at each of the segments is aligned separately from the other ones of the segments, wherein at a contact surface between two of the segments, the easy axis of one of the two segments and the easy axis of the other one of the two segments are disposed in parallel relation or at least at an angle of less than 25° to one another, thereby being tangentially or laterally disposed, wherein the magnetic circuit is closed in the radially interior area of the armature body, so that a leakage flux in a radially inner area of the radially interior area is reduced.

10. The electrical machine of claim 9, wherein the armature is constructed in the form of a rotor for a rotation machine.

11. The electrical machine of claim 9, wherein the easy axis is aligned in a radial direction, at least in an edge area adjoining the magnet pocket.

12. The electrical machine of claim 9, wherein the material is arranged contiguously between neighboring ones of the magnet pockets.

13. The electrical machine of claim 9, wherein a number of magnetic poles amounts to 4 or 6 or 8 or more than 8.

14. The electrical machine of claim 9, wherein the material has a relative magnetic permeability which along the easy axis has a value of greater than 15, preferably greater than 20, and along the hard axis has a value of less than 2, preferably less than 1.6.

15. The electrical machine of claim 9, wherein the material has a magnetic saturation which lies at a flux density of more than 0.8 Tesla, preferably at at least 1.0 Tesla.

16. The electrical machine of claim 9, wherein the material is neodymium-iron-boron, NdFeB.

* * * * *